US006427813B1

(12) United States Patent
Carlson

(10) Patent No.: US 6,427,813 B1
(45) Date of Patent: Aug. 6, 2002

(54) MAGNETORHEOLOGICAL FLUID DEVICES EXHIBITING SETTLING STABILITY

(75) Inventor: J. David Carlson, Cary, NC (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/463,166

(22) PCT Filed: Aug. 4, 1997

(86) PCT No.: PCT/US97/12871

§ 371 (c)(1),
(2), (4) Date: Jan. 18, 2000

(87) PCT Pub. No.: WO99/06731

PCT Pub. Date: Feb. 11, 1999

(51) Int. Cl.[7] .................................................. F16F 9/53
(52) U.S. Cl. .............................. 188/267.2; 267/140.14
(58) Field of Search ........................ 188/267.2, 267.1, 188/267; 267/140.14, 140.15

(56) References Cited

U.S. PATENT DOCUMENTS

| | | | | |
|---|---|---|---|---|
| 5,029,677 A | * | 7/1991 | Mitsui .......................... 188/267 |
| 5,277,281 A | * | 1/1994 | Carlson et al. .............. 188/267 |
| 5,284,330 A | | 2/1994 | Carlson et al. |
| 5,382,373 A | | 1/1995 | Carlson et al. |
| 5,398,917 A | | 3/1995 | Carlson et al. |
| 5,492,312 A | * | 2/1996 | Carlson .................. 267/140.14 |
| 5,578,238 A | | 11/1996 | Weiss et al. |
| 5,693,004 A | | 12/1997 | Carlson et al. |
| 5,816,372 A | | 10/1998 | Carlson et al. |
| 5,842,547 A | | 12/1998 | Carlson et al. |
| 5,878,851 A | | 3/1999 | Carlson et al. |
| 5,947,238 A | * | 9/1999 | Jolly et al. ................ 188/267.1 |
| 6,151,930 A | * | 11/2000 | Carlson ...................... 68/12.06 |
| 6,202,806 B1 | * | 3/2001 | Sandrin et al. ........... 188/267.1 |
| 6,296,088 B1 | | 10/2001 | Carlson |

FOREIGN PATENT DOCUMENTS

| | | | |
|---|---|---|---|
| DE | 4433056 A1 | * | 3/1996 |
| FR | 2579283 A1 | * | 9/1986 |
| GB | 756107 A | * | 8/1956 |
| JP | 56116518 A | * | 9/1981 |
| JP | 59065634 A | * | 4/1984 |
| JP | 01229134 A | * | 9/1989 |
| WO | WO-94/10693 A1 | * | 5/1994 |
| WO | WO-98/37339 A1 | * | 8/1998 |

* cited by examiner

Primary Examiner—Pam Rodriguez
(74) Attorney, Agent, or Firm—Michael M. Gnibus

(57) ABSTRACT

A magnetorheological (MR) device (20) including settling stability. The MR fluid device (20) includes a housing (22) including a hollow (30), a moving element (26) contained within the hollow (30), the housing (26) and moving element (26) cooperating to form a working section (36) and a chamber (32) within the hollow (30), a MR fluid (38) contained within the working section (36) and the chamber (32), a coil (40) or the like for generating a magnetic field to act upon the MR fluid (38) contained within the working section (36) to cause a rheology change therein, and a magnet (25) or electromagnet (31) generating a low-level magnetic field to act upon a substantial portion of the MR fluid (38) contained in the chamber (32) to minimize settling of the particles in the MR fluid. Linear and rotary acting embodiments are included.

16 Claims, 4 Drawing Sheets

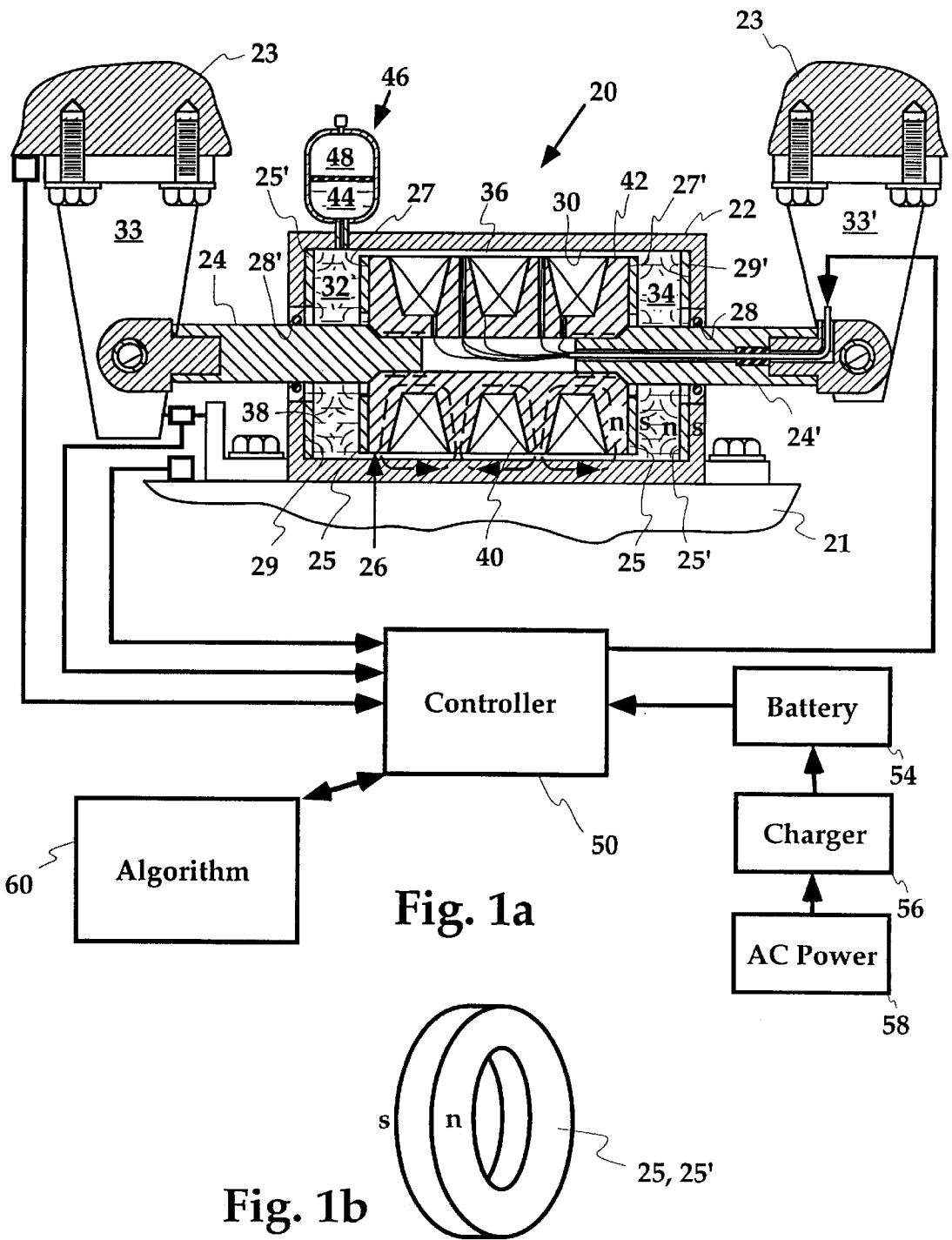

MAGNETORHEOLOGICAL FLUID DEVICES EXHIBITING SETTLING STABILITY

FIELD OF THE INVENTION

This invention relates to the area of controllable fluid devices. Specifically, it relates to controllable fluid devices which utilize a magnetically controllable fluid.

BACKGROUND OF THE INVENTION

Dampers are known which use a hydraulic fluid as the working medium to create damping forces to control motion, shock, and/or vibration. One special class of these devices include a Magnetorheological (MR) fluid. MR fluid devices are of particular interest because they only require small electrical currents (typically several amps or less) and do not present a potential shock hazard, because they operate at low voltage (typically 12 volts or less). MR fluid devices, such as dampers, brakes, and clutches employ a controllable Magnetorheological (MR) fluid comprised of small soft-magnetic particles dispersed within a liquid carrier. Typical particles include carbonyl iron, or the like, having various shapes, but which are preferably spherical, and which exhibit mean diameters of between about 0.1 $\mu$m to 500 $\mu$m, and more preferably between about 1 $\mu$m and 100 $\mu$m. The carrier fluids include various known hydraulic oils, and the like. These MR fluids exhibit a thickening behavior (a rheology change), sometimes referred to as an "apparent viscosity change", upon being exposed to a magnetic field of sufficient strength. The higher the magnetic field strength exposed to the MR fluid, the higher the resistance (damping force, braking or locking torque) that can be achieved within the particular MR device. Examples of MR fluid may be found in U.S. Pat. Nos. 5,578,238 and 5,382,373.

In particular, MR fluid devices provide controllability through simple fluctuations in the electrical current supplied to the magnetic field generator (generally a wound-wire coil). Descriptions of prior art MR mounts and dampers may be found in U.S. Pat. Nos. 5,492,312, 5,398,917, 5,284,330, and 5,277,281 and copending U.S. Ser. No. 08/674,179 now U.S. Pat. No. 5,878,851, entitled "Controllable Vibration Apparatus". Descriptions of controllable brakes may be found in copending U.S. Ser. Nos. 08/674,371, now U.S. Pat. No. 5,842,547, entitled "Controllable Brake" and 08/304,005, now U.S. Pat. 5,816,372, entitled "Magnetorheological Fluid Devices and Process of Controlling Force in Exercise Equipment Utilizing Same".

Recently, the use of MR dampers has been proposed for control of civil engineering structures for earthquake hazard mitigation. MR dampers, because of their low power requirements, are highly adaptable to battery power operation. Notably, loss of the main electrical power source during a seismic event is a reality that must be contended with, making MR dampers attractive. In these applications, the MR fluids used must be able to withstand relatively long stationary periods (as much as 20 years or more). In particular, settling of the particles in the MR fluid may be detrimental to the device's performance. Much formulation work has been done regarding various means for minimizing settling in the fluids, some more effective than others. For example, PCT/US97/02743 entitled "Magnetorheological Fluid Seismic Damper" describes a "licorice custard" fluid which has a custard like consistency which prevents settling. PCT/US97/02322 entitled "Controllable Fluid Rehabilitation Device Including A Reservoir of Fluid" teaches applying a low-level magnetic field to a large reservoir of fluid to prevent settling of the particles in an exercise device into which the user inserts a body part. Notably, settling of particles in the MR fluid still presents a problem which is difficult to overcome through formulation alone. Further, settling of the particles within damper and brakes is a problem which has been largely unsolved. Therefore, there is a need for a device which is time stable, and in which, the fluids will not settle.

SUMMARY OF THE INVENTION

In light of the advantages and drawbacks of prior art systems, the resent invention is a magnetorheological fluid device comprising a housing including a hollow, a moving element contained within said hollow, said housing and said moving element oriented to form at least one working section and at least one chamber within said hollow, a magnetorheological fluid contained within said at least one working section and said at least one chamber, means for generating a magnetic field to act upon said magnetorheological fluid contained within said at least one working section to cause a rheology change therein, and means for generating a low-level magnetic field to act upon a substantial portion of said magnetorheological fluid contained in said at least one chamber to minimize settling of said magnetorheological fluid contained therein. The device may be a damper including a damper piston assembly having first and second ends and first and second chambers spaced on either end thereof. The invention has particular application in combination with civil and other structures which include first and second relatively moveable structural elements wherein said housing interconnects to said first structural element and said moving portion interconnects to said second structural element.

According to one novel aspect, the means for generating the low-level magnetic field includes at least one electromagnet. The electromagnet may be mounted to a wall portion of said housing or mounted to said first and second ends of said piston assembly. According to another aspect, the means for generating the low-level magnetic field includes at least one permanent magnet. The permanent magnet(s) may be housed within each of said first and second chambers, attached at said first and second ends of said damper piston assembly, or mounted to a wall portion of said housing, or combinations thereof. According to another aspect, the permanent magnet(s) is a strip magnet arranged on an outer wall portion of the housing or a portion of the wall itself may be magnetized. The invention also has applicability to brakes and clutches wherein said housing is an outer member and said moving element is a rotor received therein. Accordingly, the means for generating a low-level magnetic field may be mounted on said rotor or to a wall portion of said housing.

It is an advantage of the present invention MR device that it is time stable, in that it can be placed in service for many years without settling of the particles contained in the working MR fluid.

It is an advantage of the present invention MR device that the fluid within the device does not settle, yet off state resistance is not appreciably affected.

The above-mentioned and further features, advantages, and characteristics of the present invention will become apparent from the accompanying descriptions of the preferred embodiments and attached drawings.

BRIEF DESCRIPTION OF THE DRAWINGS

The accompanying drawings which form a part of the specification, illustrate several key embodiments of the present invention. The drawings and description together, serve to fully explain the invention. In the drawings, FIG. 1a illustrates a partial cross-sectioned side view of a MR damper, FIG. 1b illustrates a isometric view of a ring-type magnet that is mounted within the chambers of the damper of FIG. 1a, FIG. 2a illustrates a partial cross-sectioned side view of a first embodiment of MR damper.

DETAILED DESCRIPTION OF THE PREFERRED EMBODIMENTS

Figures 2A, 2B:
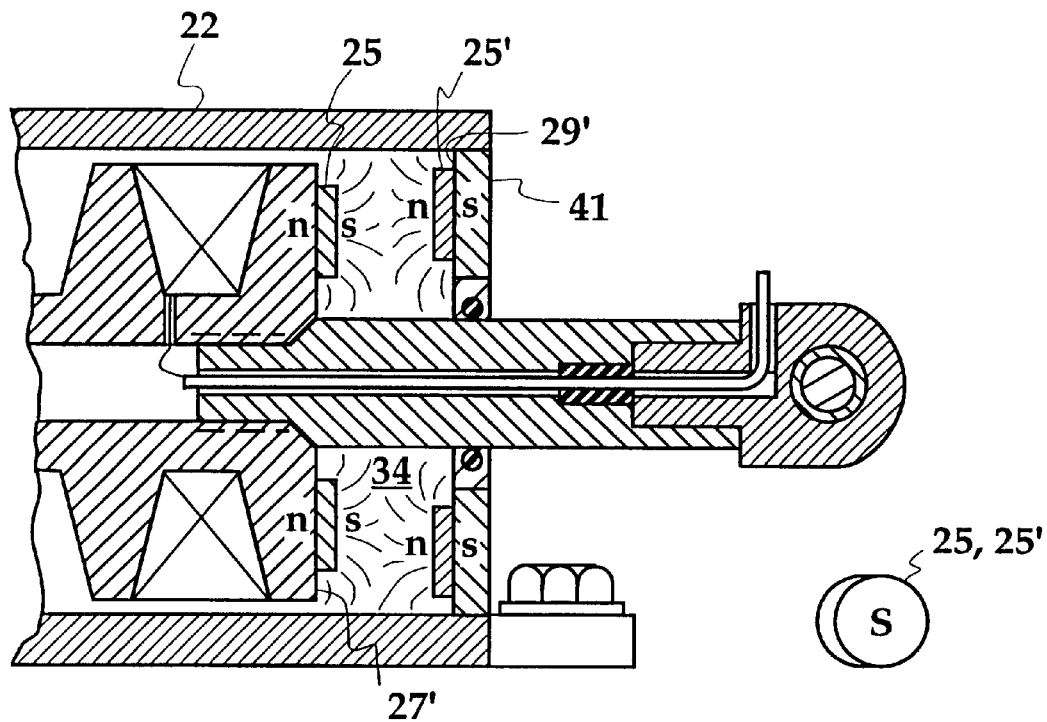
FIG. 2b illustrates a isometric view of a button-type magnet that is mounted within the chambers of the damper of FIG. 2a, FIG. 3a illustrates a partial cross-sectioned side view of a second embodiment of MR damper.

Referring now to the Drawings where like numerals denote like elements, in FIG. 1a, shown generally at 20, is a preferred embodiment of the MR device, specifically, an MR damper. The damper 20 preferably provides controllable damping forces between a first structural member 21 (such as a first portion of a building or bridge) and a second structural member 23, (such as a second portion of a building or bridge). Likewise, the damper 20 may be used for control of vibrations/movement in other large civil engineering structures or, in general, just between any two relatively moveable structures. The damper 20 comprises a generally cylindrical housing or body 22, which is preferably a partially closed-ended hollow cylinder manufactured from a magnetically-soft material, such as low-carbon steel. The housing 22 has a hollow 30 formed therein and at least one circular aperture, and preferably two apertures 28, 28' formed in the terminal ends thereof.

At least one piston rod, and preferably two piston rods 24, 24', are axially slidably received within the at least one, and preferably two apertures 28, 28'. The circular apertures 28, 28' preferably include bearing and seal assemblies to center the piston assembly 26 and prevent escape of the MR fluid 38. The means for attaching the housing 22 to the first structural member 21 comprises flanges and bolts, pins, weldments, or the like. Likewise, the means for attaching the at least one, and preferably two, piston rods 24, 24' to the second structural member 23 comprises rod ends threadedly secured to piston rods 24, 24' and brackets 33, 33', secured to second structural member 23 by bolts, pins, weldments, or the like.

The piston assembly 26 is threadedly attached to said at least one, and preferably two piston rods 24, 24' by way of threaded ends formed on piston rods 24, 24'. The piston assembly 26 is axially moveable within the hollow 30 thereby dividing same into a first and second chambers 32, 34. Notably, a working portion (gap) 36 is formed between the piston assembly 26 and inner diameter of housing 22.

This working portion 36 is preferably annular-shaped and formed by the interaction and orientation of the housing 22 and piston assembly 26. Notably, the working portion 36 may alternatively pass through the piston assembly 26 as is known to those of ordinary skill in the MR damper arts. By energizing the plurality of alternately wound coils 40 with the appropriate electrical current (generally about 1 Amp— requiring power of about 22 watts), magnetic fields are generated of sufficient strength to control flow of MR fluid 38 between the first and second chambers 32, 34. This provides controllable damping forces which may be controlled via any known control algorithm.

Any suitable magnetorheological fluid 38 may be used. The MR fluid 38 is contained in the working portion 36, the first chamber 32, and the second chamber 34, as well as in an external compensator chamber 44. The external third chamber 44 is included within an accumulator 46, which also includes a gas charge chamber 48 for pressurizing the MR fluid 38 within damper 20. The accumulator 46 also allows for expansion and contraction of the MR fluid 38 within the damper 20 but also pressurizes the fluid 38 in the damper 20 such that any cavitation is minimized.

The piston assembly 26 includes a plurality of axially-spaced and alternately-wound coils 40 for generating a plurality of magnetic fields which are directed by magnetically-soft pole pieces 42 to act upon the MR fluid 38 contained in the working portion 36, thereby generating rheology changes (an apparent viscosity change) which restricts the flow of the MR fluid 38 through the working portion 36. This creates the variable damping forces. Suitable materials for the poles pieces 42 and housing 22 comprise magnetically-soft materials, such as 12L14 low-carbon steel.

A preferably digital controller 50 controls the MR damper 20 via any of the known algorithms. This may include taking sensor information representative of the movement of the first and second members 21, 23 from acceleration sensors which sense horizontal acceleration of the members 21, 23. Further, displacement or velocity may be directly measured and provided via a horizontal displacement or velocity sensor between members 21, 23. Notably, if power is lost, a battery supplies the power requirements of the MR damper 20 and controller 50.

The controller 50 processes the sensor signals from one or more of the sensors according to the appropriate algorithm 60 and provides the appropriate output signal to the MR damper 20. Various control algorithms are known to those of skill in the art, such as clipped-optimal control based upon acceleration feedback found in "Modeling and Control of Magnetorheological Dampers for Seismic Response Reduction" by Dyke, Spencer, Sain, and Carlson (Aug. 1, 1996). Other algorithms based upon velocity and/or displacement input may be used. Notably, during a seismic event, the device operates off the DC current of the battery 54, as power is likely lost immediately or shortly after the start of the seismic event. A charger 56 which operates off AC power source 58 periodically charges the battery 54 to ensure a full charge.

The means for generating a low-level magnetic field in the first and second chambers 32, 34 is preferably comprised of at least one permanent magnet 25 secured to the ends 27, 27' of piston assembly 26 or at least one permanent magnet 25' mounted on a wall portion 29, 29' of the housing. Preferably, magnets 25, 25' are mounted to both the axially opposite ends 27, 27' of piston assembly 26 and to the internal wall portion 29, 29' of housing 22. However, one or the other may be sufficient. For example, only on the piston assembly 26 or only on the wall portion 29, 29' of the housing 22. The permanent magnets 25, 25' are preferably ring-type magnets as shown in FIG. 1b and are of the appropriate strength such that they produce a magnetic field to control settling. Magnets and electromagnets described herein should preferably produce fields having strengths in the range of 5–500 Oersteds (400–40,000 A/m), more preferably 25–200 Oersteds (2000–16,000 A/m), and more preferably yet 75–125 Oersteds (6000 to 10,000 A/m) to prevent settling of the iron particles in the MR fluid 38 within the chambers 32, 34. Magnets manufactured from barium or strontium ferrite are preferable. Other that could be used are manufactured from neodymium iron boron, bonded neodymium iron boron, semarium cobalt, and alnico. The magnets 25, 25' are secured in place via their attractive forces to the ends 27, 27' and wall portions 29, 29', but may be glued as well.

Alternatively, a plurality of puck-type or button-type magnets 25, 25' may be arranged in a circular pattern (example: located at the 12, 3, 6, and 9 o'clock positions) within the chambers 32, 34 and located at the axial ends 27, 27' of piston assembly 26 and/or also mounted on a wall portion 29, 29' of housing 22 as shown in FIG. 2a to providing the means for generating a low-level magnetic field of the strength afore-mentioned within chambers 32, 34. A button-type magnet is illustrated in FIG. 2b.

Alternatively, the ends 41 of housing 22 may be manufactured from a hard magnetic material, such as 1040 series carbon steel. The material when subjected to a high magnetic field will magnetize to the appropriate strength to prevent settling of the fluid within the chambers 32, 34.

Figures 3A, 3B:
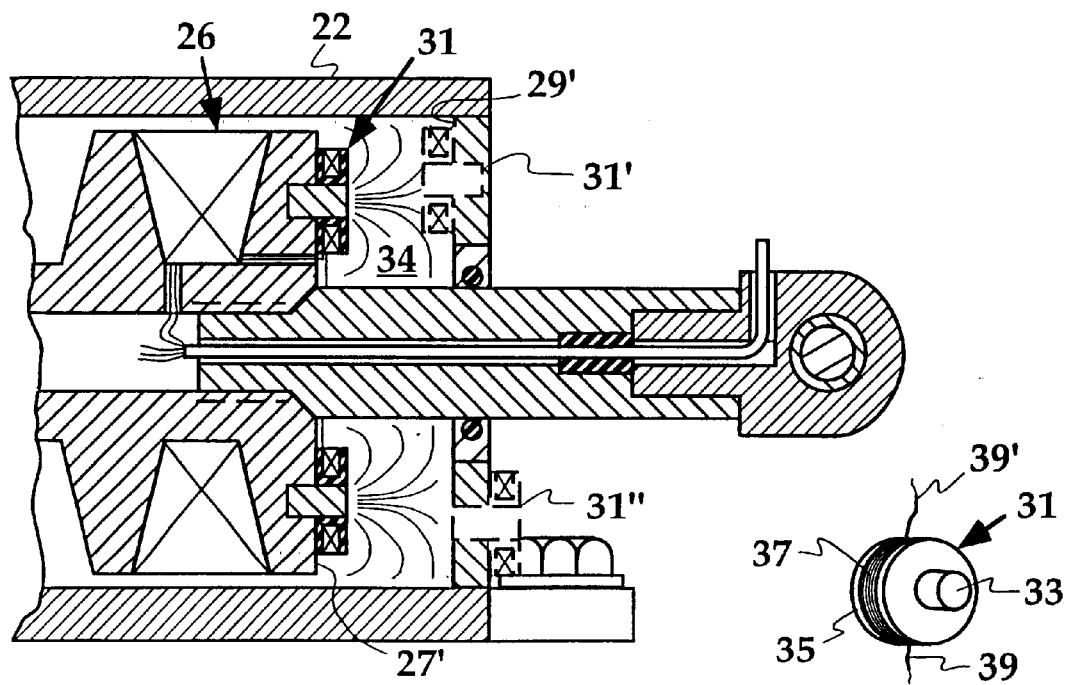
FIG. 3b illustrates a isometric view of a electromagnet that is mounted within the chambers or to a wall portion of the damper of FIG. 3a, FIGS. 4a and 4b illustrate partial cross-sectioned side views of a first and second embodiment of MR brake.

Referring to FIG. 3a, in another aspect, the means for generating the afore-mentioned low-level magnetic field within chambers 32, 34 is comprised of at least one electromagnet 31. Preferably, a plurality of electro-magnets 31 are arranged in a circular pattern (ex: the 12, 3, 6, and 9 o'clock positions) at the axial ends 27, 27' of piston assembly 26 and preferably also mounted on a wall portion 29, 29' of the housing 22. As shown in FIG. 3b, the electromagnet 31 is preferably comprised of a soft-magnetic focusing element 33 pressed into a plastic bobbin 35 and circumferentially wound with a sufficient amount of wire to form a low-level coil 37. Electrical leads 39, 39' interconnect to power and ground, as appropriate. Preferably, the plurality of electromagnets within the chambers 32, 34 are wired in electrical series relationship. The electro-magnet has the advantage that it may be switched off completely when initiating the control algorithm (such as during a seismic event), thereby resulting in a lower off state as compared to the afore-mentioned permanent magnet versions. As before, the electromagnet 31 may also be mounted to a wall portion 29' of housing 22 as shown by dotted outlines 31', 31". As shown, the means for providing low-level magnetic field may be mounted internally within the hollow or externally therefrom. If mounted externally, ends of the housing should be non-magnetic.

Figure 4A:
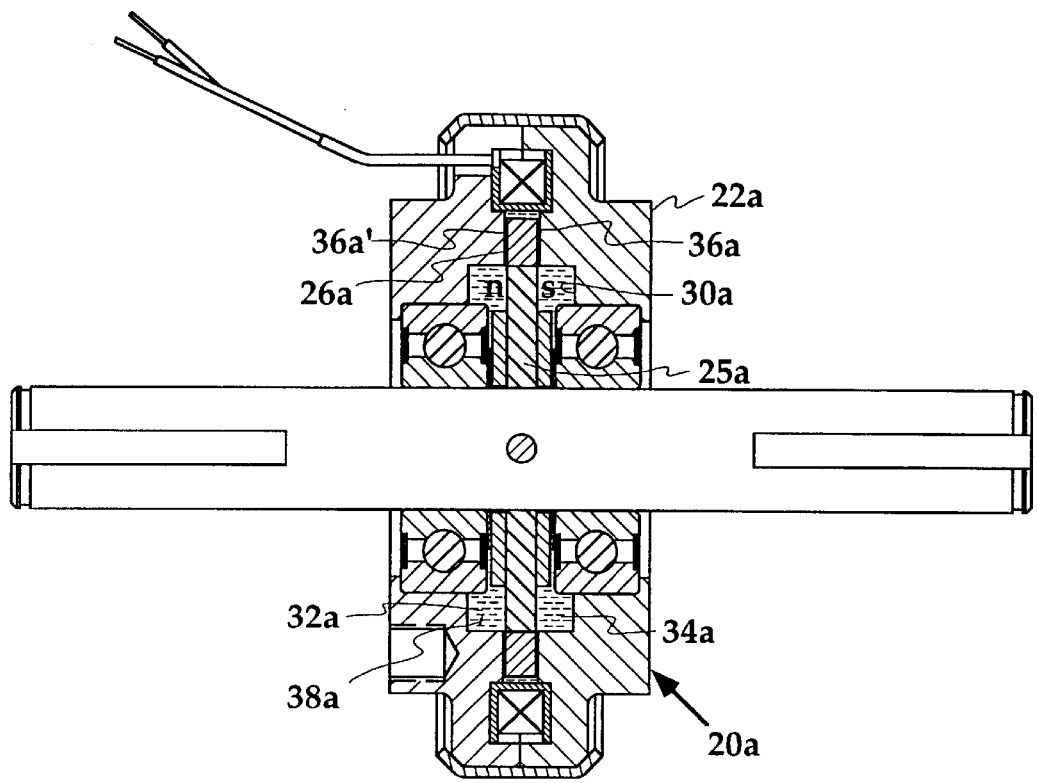
Figure 4B:
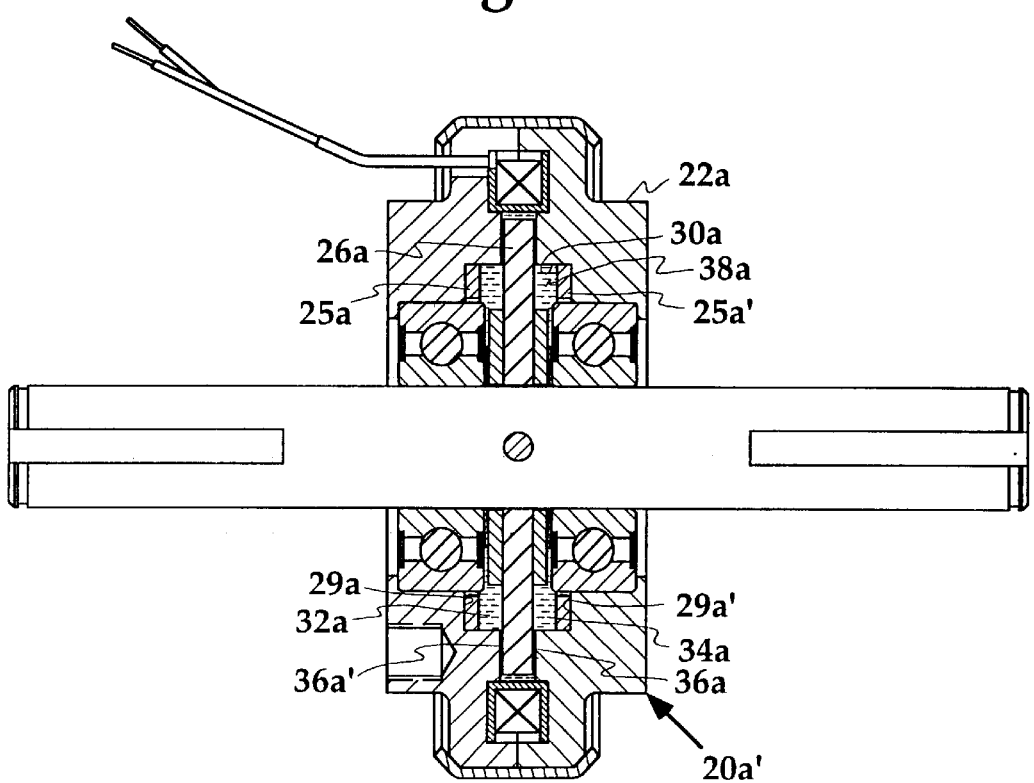

FIGS. 4a and 4b illustrate brake embodiments of the MR device 20a, 20a'. Each of these embodiments includes a housing 22a including a hollow 30a, a moving element such as the rotor 26a contained within the hollow 30a, said housing 22a and said rotor 26a are oriented to form at least one working portion which preferably takes the form of multiple gaps 36a, 36a' and at least one chamber, and preferably two chambers 32a, 34a within said hollow 30a, a MR fluid 38a contained within the gaps 36a, 36a' and the chambers 32a, 34a, means for generating a magnetic field to act upon said MR fluid 38a contained within said gaps 36a, 36a' to cause a rheology change therein, and means for generating a low-level magnetic field to act upon a substantial portion (the bulk portion of) said MR fluid 38a contained in the chambers 32a, 34a to minimize settling of said MR fluid 38a contained therein.

Figure 5:
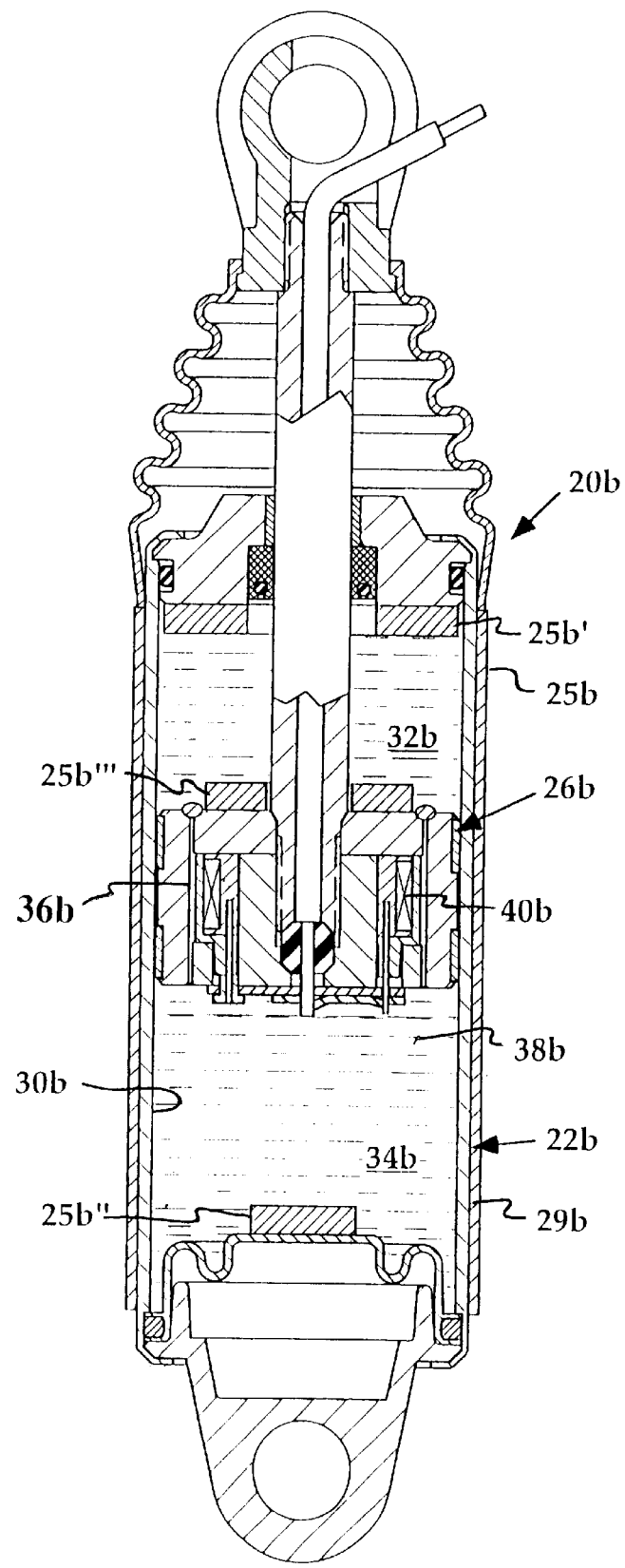
FIG. 5 illustrates a partial cross-sectioned side view of an embodiment of single tube MR damper.

In the FIG. 4a embodiment, the means for generating a magnetic field acting across the gaps 36a, 36a' is comprised of a ring-type permanent magnet 25a which forms the inner portion of the rotor 26a which is located adjacent to the chambers 32a, 34a. The north (n) and south (s) poles are oriented such that a substantial portion of the MR fluid 38a in the chambers 32a, 34a is exposed to a low-level magnetic field of the above-mentioned magnitude. This minimizes settling of the MR fluid 38a within the brake 20a when it is not in use. Optionally, the inner most portion of rotor 26a may include a hard-magnetic material which is magnetized to the appropriate strength to cause light alignment of the particles thereby preventing settling thereof. In the FIG. 4b embodiment, permanent magnets 25a, 25a' mounted on an inner wall portion 29a, 29a' of the housing 22a provide the means for generating the low-level magnetic field. Although, ring type magnets 25a, 25a' are shown, other types, such as strip, puck/button, or electromagnets could be substituted therefore, as is apparent from the foregoing examples. Although brake embodiments are illustrated, the present invention has applicability to clutches for preventing settling of fluids therein, as well FIG. 5 illustrates another embodiment of the present invention device, specifically, a single tube MR damper 20b. The MR damper 20b includes a generally cylindrical housing (damper body) 22b including a hollow 30b formed therein, a moving element, such as a piston assembly 26b, contained within said hollow 30b, said housing 22b and piston assembly 26b oriented to form at least one working section in the form of an annular controllable passageway 36b and subdivide said hollow 30b into first and second chambers 32b, 34b. The damper 20b also includes a MR fluid 38b contained within said annular controllable passageway 36b and the first and second chambers 32b, 34b, means for generating a magnetic field to act upon said MR fluid 38b contained within the annular controllable passageway 36b to cause a rheology change therein, and separate means for generating a low-level magnetic field to act upon a substantial portion said MR fluid contained in the first and second chambers 32b, 34b to minimize settling of said MR fluid therein. Preferably, the means for generating the magnetic field which is exposed to the annular controllable passageway 36b is comprised of a wound coil 40b or the like, but may include a permanent magnet also. The means for generating a low-level magnetic field is preferably comprised of a permanent strip-type magnet 25b mounted on an external wall portion 29b of the housing 22b. The strip permanent magnet 25b may be arranged circumferentially or in axially extending strips. In this embodiment, the low-level magnetic field is also exposed to the annular controllable passageway 36b. Alternatively, magnets 25b', 25b", and 25b"' may comprise the means for generating a low-level magnetic field.

While several embodiments including the preferred embodiment of the present invention have been described in detail, various modifications, alterations, changes, and adaptations to the afore-mentioned may be made without departing from the spirit and scope of the present invention defined in the appended claims. It is intended that all such modifications, alterations, and changes be considered part of the present invention.

I claim:

1. A magnetorheological fluid device, comprising:
   (a) a housing including a hollow,
   (b) a moving element contained within said hollow, said housing and said moving element oriented to form at least one working section and at least one chamber within said hollow, (c) a magnetorheological fluid contained within said at least one working section and said at least one chamber, (d) means for generating a magnetic field to act upon said magnetorheological fluid contained within said at least one working section to cause a rheology change therein, (e) means for generating a low level magnetic field to act upon a substantial portion of said magnetorheological fluid contained in said at least one chamber to minimize settling of said magnetorheological fluid contained therein, said means for generating a low level magnetic field being located away from said means for generating a magnetic field.

2. The device of claim 1 wherein the device is a damper and wherein said moving element comprises a damper piston assembly including first and second ends and wherein the at least one chamber comprises first and second chambers spaced on either end of said piston assembly.

3. The device of claim 2 in combination with a structure including first and second relatively moveable structural elements wherein said housing interconnects to said first structural element and said moving portion interconnects by way of a piston rod to said second structural element.

4. A damper of claim 2 wherein said means for generating a low level magnetic field includes at least one electromagnet.

5. A damper of claim 4 wherein said at least one electromagnet is mounted to a wall portion of said housing.

6. A damper of claim 5 wherein said at least one electromagnet is mounted to said first and second ends of said piston assembly.

7. The device of claim 2 wherein said means for generating a low level magnetic field includes at least one permanent magnet.

8. The device of claim 7 wherein said at least one permanent magnet is housed within each of said first and second chambers.

9. The device of claim 8 wherein said at least one permanent magnet is attached at said first and second ends of said damper piston assembly.

10. The device of claim 7 wherein said at least one permanent magnet is mounted to a wall portion of said housing.

11. A damper of claim 7 wherein said at least one permanent magnet is a strip magnet arranged on an outer surface of said housing.

12. A device of claim 1 wherein said housing is an outer member of a brake and said moving element is a rotor.

13. A device of claim 12 wherein said means for generating said low level magnetic field includes a permanent magnet.

14. A device of claim 13 wherein said permanent magnet is mounted on a wall portion forming said at least one chamber.

15. A device of claim 13 wherein said permanent magnet is mounted on said rotor.

16. The device of claim 1 wherein said means for generating a low level magnetic field includes magnetizing a hard magnetic material adjacent said at least one chamber.

* * * * *